US012597795B2

(12) United States Patent
Hacker Davidson et al.

(10) Patent No.: US 12,597,795 B2
(45) Date of Patent: Apr. 7, 2026

(54) SYSTEMS AND METHODS FOR ADAPTIVE USB CHARGING

(71) Applicant: The NOCO Company, Glenwillow, OH (US)

(72) Inventors: Andrea Carolina Hacker Davidson, Phoenix, AZ (US); Travers Kenton Buda, Tempe, AZ (US)

(73) Assignee: The Noco Company, Glenwillow, OH (US)

( * ) Notice: Subject to any disclaimer, the term of this patent is extended or adjusted under 35 U.S.C. 154(b) by 644 days.

(21) Appl. No.: 18/182,432

(22) Filed: Mar. 13, 2023

(65) Prior Publication Data

US 2024/0291308 A1      Aug. 29, 2024

Related U.S. Application Data

(60) Provisional application No. 63/486,529, filed on Feb. 23, 2023.

(51) Int. Cl.
*H02J 7/00*                (2006.01)
(52) U.S. Cl.
CPC .... *H02J 7/00714* (2020.01); *H02J 7/007182* (2020.01); *H02J 2207/30* (2020.01)
(58) Field of Classification Search
CPC ............. H02J 7/00714; H02J 7/007182; H02J 2207/30
USPC ........................................................ 320/107
See application file for complete search history.

(56) References Cited

U.S. PATENT DOCUMENTS

| | | |
|---|---|---|
| 2017/0163060 A1 | 6/2017 | Zheng et al. |
| 2017/0214261 A1 | 7/2017 | Gratton |
| 2017/0310122 A1 | 10/2017 | Chang et al. |
| 2018/0145517 A1 | 5/2018 | Krishna et al. |
| 2019/0334369 A1* | 10/2019 | Tian ........................... H02J 7/06 |
| 2020/0028368 A1* | 1/2020 | Nook ..................... H02J 7/0034 |

OTHER PUBLICATIONS

Patent Cooperation Treaty, PCT/US2023/065711, International Preliminary Report on Patentability, dated Aug. 15, 2025.
(Continued)

*Primary Examiner* — Nathaniel R Pelton
(74) *Attorney, Agent, or Firm* — Jones Day

(57) ABSTRACT

Systems and methods are provided for charging a chargeable electronic device with a USB interface. An example method includes comparing a charging voltage level of a charging device to a charge voltage rage. The method may further include charging a battery with a charging current based on the charging voltage level being within the charging voltage range. The method may further include comparing the charging current to a charge current range, and increasing the charging current based on a determination that it is within the charge current range. The method may involve again comparing the charging voltage level to the charge voltage range and the charging current to the charge current range, and continuing to charge the chargeable electronic device with the charging current based on a determination that the charging voltage level is within the charge voltage range and the charging current is within the charge current range.

17 Claims, 9 Drawing Sheets

(56)            References Cited

OTHER PUBLICATIONS

Patent Cooperation Treaty, PCT/US2023/065711, International Search Report and Written Opinion, Sep. 29, 2023.
He, "USB Port and Power Delivery: An Overview of USB Port Interoperability," 2015 IEEE Symposium on Product Compliance Engineering (ISPCE), Chicago, IL, pp. 1-5, Aug. 2023.

\* cited by examiner

600

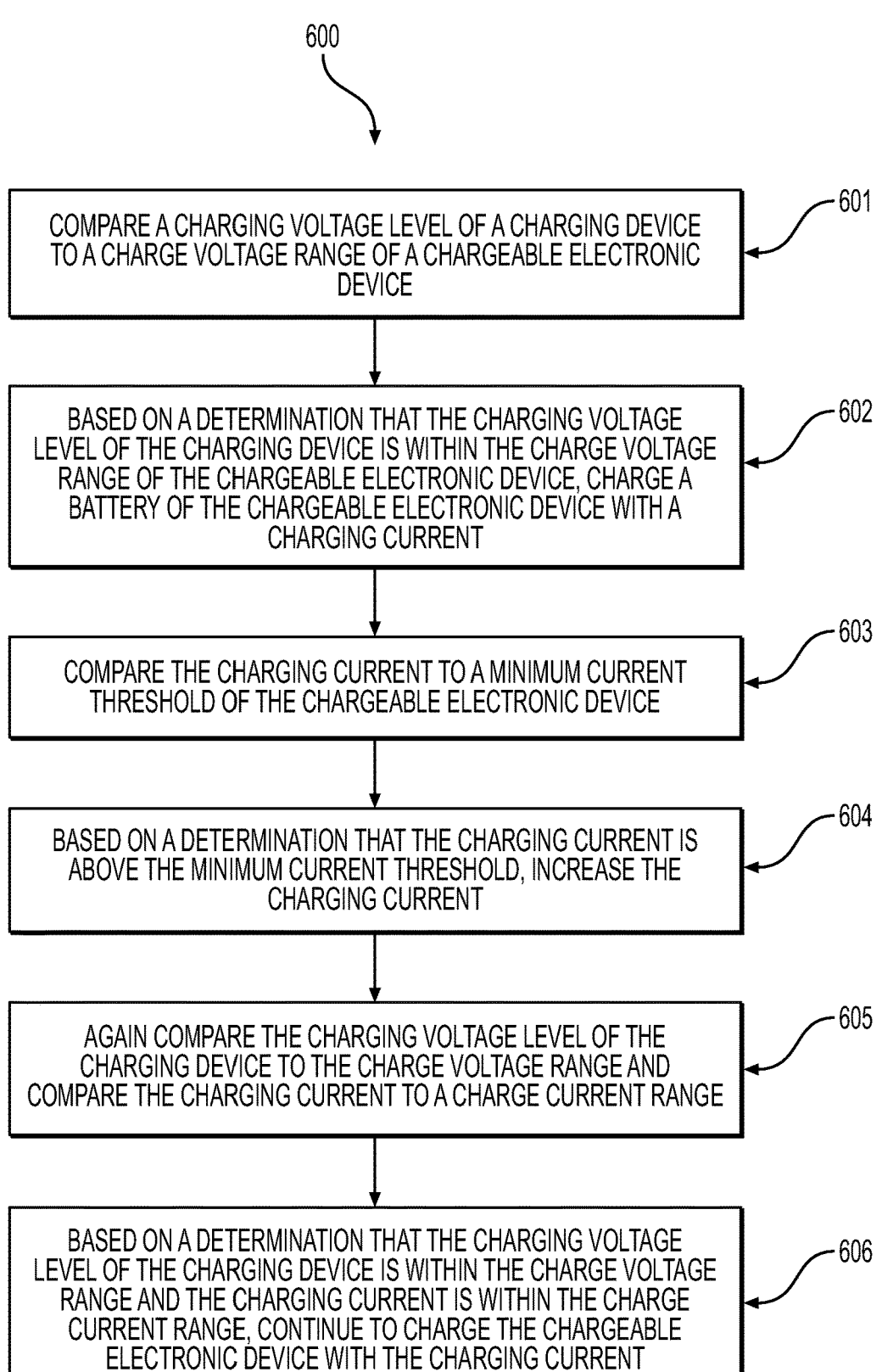

601
COMPARE A CHARGING VOLTAGE LEVEL OF A CHARGING DEVICE TO A CHARGE VOLTAGE RANGE OF A CHARGEABLE ELECTRONIC DEVICE

602
BASED ON A DETERMINATION THAT THE CHARGING VOLTAGE LEVEL OF THE CHARGING DEVICE IS WITHIN THE CHARGE VOLTAGE RANGE OF THE CHARGEABLE ELECTRONIC DEVICE, CHARGE A BATTERY OF THE CHARGEABLE ELECTRONIC DEVICE WITH A CHARGING CURRENT

603
COMPARE THE CHARGING CURRENT TO A MINIMUM CURRENT THRESHOLD OF THE CHARGEABLE ELECTRONIC DEVICE

604
BASED ON A DETERMINATION THAT THE CHARGING CURRENT IS ABOVE THE MINIMUM CURRENT THRESHOLD, INCREASE THE CHARGING CURRENT

605
AGAIN COMPARE THE CHARGING VOLTAGE LEVEL OF THE CHARGING DEVICE TO THE CHARGE VOLTAGE RANGE AND COMPARE THE CHARGING CURRENT TO A CHARGE CURRENT RANGE

606
BASED ON A DETERMINATION THAT THE CHARGING VOLTAGE LEVEL OF THE CHARGING DEVICE IS WITHIN THE CHARGE VOLTAGE RANGE AND THE CHARGING CURRENT IS WITHIN THE CHARGE CURRENT RANGE, CONTINUE TO CHARGE THE CHARGEABLE ELECTRONIC DEVICE WITH THE CHARGING CURRENT

*FIG. 6*

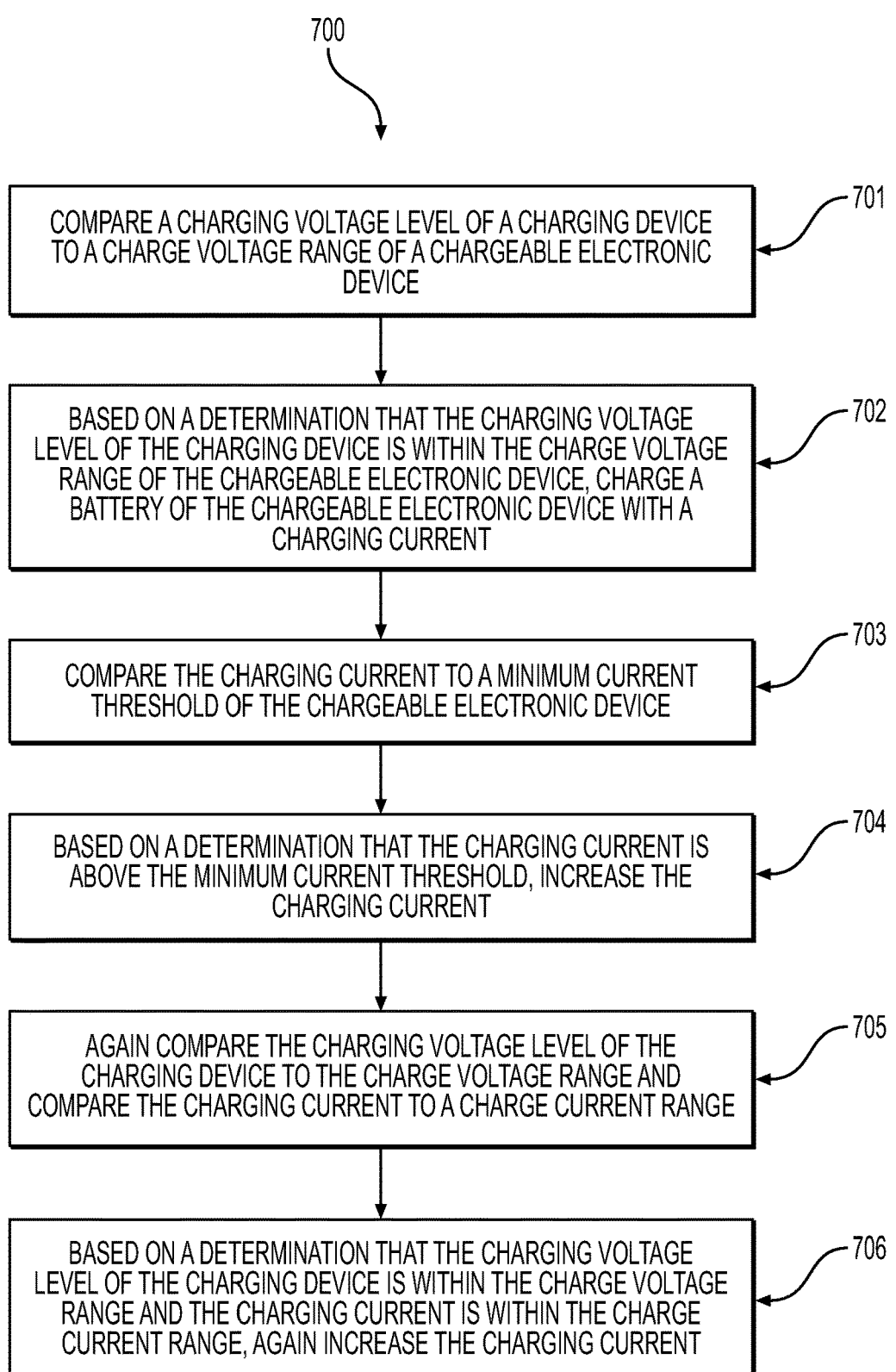

700

701 — COMPARE A CHARGING VOLTAGE LEVEL OF A CHARGING DEVICE TO A CHARGE VOLTAGE RANGE OF A CHARGEABLE ELECTRONIC DEVICE

702 — BASED ON A DETERMINATION THAT THE CHARGING VOLTAGE LEVEL OF THE CHARGING DEVICE IS WITHIN THE CHARGE VOLTAGE RANGE OF THE CHARGEABLE ELECTRONIC DEVICE, CHARGE A BATTERY OF THE CHARGEABLE ELECTRONIC DEVICE WITH A CHARGING CURRENT

703 — COMPARE THE CHARGING CURRENT TO A MINIMUM CURRENT THRESHOLD OF THE CHARGEABLE ELECTRONIC DEVICE

704 — BASED ON A DETERMINATION THAT THE CHARGING CURRENT IS ABOVE THE MINIMUM CURRENT THRESHOLD, INCREASE THE CHARGING CURRENT

705 — AGAIN COMPARE THE CHARGING VOLTAGE LEVEL OF THE CHARGING DEVICE TO THE CHARGE VOLTAGE RANGE AND COMPARE THE CHARGING CURRENT TO A CHARGE CURRENT RANGE

706 — BASED ON A DETERMINATION THAT THE CHARGING VOLTAGE LEVEL OF THE CHARGING DEVICE IS WITHIN THE CHARGE VOLTAGE RANGE AND THE CHARGING CURRENT IS WITHIN THE CHARGE CURRENT RANGE, AGAIN INCREASE THE CHARGING CURRENT

*FIG. 7*

SYSTEMS AND METHODS FOR ADAPTIVE USB CHARGING

CROSS-REFERENCE TO RELATED APPLICATIONS

This application claims priority to U.S. Provisional Application No. 63/486,529, filed Feb. 23, 2023, which is incorporated herein by reference in its entirety.

FIELD

The present disclosure relates to systems and methods for charging electronic devices.

BACKGROUND

Some power charging protocols (e.g., USB-C) provide for power negotiations between power sources (e.g., battery chargers) and power sinks (e.g., chargeable electronic devices) prior to charging. These power negotiations involve communication between the power source and power sink, and can be used to establish charging parameters (e.g., charging current and charging voltage) that both effectively charge a chargeable battery and remain within operating parameters of the power source and power sink. The negotiation between a power source and a power sink can involve the power source sending a source capabilities message over positive and negative data pins within a USB plug of the power source that represents the charging parameters of which the power source is capable. The power sink can then evaluate the source capabilities message, which may include a plurality of charging parameters, and send a power request message requesting that the power source charge the power sink at charging parameters specified in the power request message. The power source can then evaluate the power request message and determine whether it can charge the power sink at the specified charging parameters. The power source can then send the power sink an accept message and begin charging the power sink at the charging parameters specified in the request message. If the power source is incapable of charging the power sink at the specified parameters, it can send the power sink a deny message and provide no power to the power sink.

However, some conventional power sinks (e.g., chargeable electronic devices) employ older charging protocols and do not have the ability to negotiate with power sources to establish effective charging parameters. For example, some conventional chargeable electronic devices rely on a fixed hardware signal (e.g., a resistor on a charging cable) to determine an upper limit of charging power or charging current they can receive (e.g., sink) or generate (e.g., source). Some charging cables may thus include hardware (e.g., a resistor) indicating low charging parameters (e.g., 500 mA charging current) to establish compatibility with a wide range of low-power external power supplies, including those not employing USB-Power Delivery (USB-PD) technology. As a result, conventional chargeable electronic devices may be charged at charging parameters lower than those which they are capable of receiving, even when coupled to charging sources capable of producing greater charging parameters. This can result in longer charge times and damage to batteries within the conventional chargeable electronic devices.

Furthermore, conventional chargeable electronic devices may power auxiliary circuits (e.g., LEDs or USB output ports) that consume more power from a rechargeable battery of the conventional chargeable electronic device than is being distributed to the rechargeable battery by the charging parameters of the power source. The rechargeable battery of the conventional chargeable electronic device may thus experience a net decrease in battery charge when connected to the power source. Therefore, there is a need in the art for chargeable electronic devices not capable of conventional power negotiations that can be charged by power sources at improved and effective charging parameters.

SUMMARY

An example method of charging a chargeable electronic device may comprise comparing a charging voltage level of a charging device to a charge voltage range of an electronic device. The method may further comprise charging a battery of the electronic device with a charging current based on a determination that the charging voltage level of the charging device is within the charge voltage range of the electronic device. The method may further comprise comparing the charging current to a minimum current threshold of the electronic device. The method may further comprise increasing the charging current based on a determination that the charging current is within the charge current range. The method may further comprise again comparing the charging voltage level of the charging device to the charge voltage range and comparing the charging current to a charge current range. Furthermore, the method may comprise continuing to charge the chargeable electronic device with the charging current based on a determination that the charging voltage level of the charging device is within the charge voltage range and the charging current is within the charge current range.

The method may be performed without power negotiation between the charging device and the chargeable electronic device. The method may further comprise determining whether an auxiliary circuit of the electronic device is enabled or disabled based on a determination that the charging current is at or below the minimum current threshold. The method may further comprise disabling the auxiliary circuit based on a determination that the auxiliary circuit is enabled. The method may further comprise placing the electronic device in a low power mode or displaying an error indicator on the electronic device based on a determination that the auxiliary circuit is disabled. The method may further comprise decreasing the charge current and again comparing the charging voltage level of the charging device to the charge voltage range and again comparing the charging current to the charge current range based on a determination that the charging voltage level of the charging device is not within the charge voltage range or the charging current is not within the charge current range.

A further example method of charging a chargeable electronic device with a USB interface comprises comparing a charging voltage level of a charging device to a charge voltage range of a chargeable electronic device. The method may further comprise based on a determination that the charging voltage level of the charging device is within the charge voltage range of the chargeable electronic device, charging a battery of the chargeable electronic device with a charging current. The method may further comprise comparing the charging current to a minimum current threshold of the chargeable electronic device. Based on a determination that the charging current is above the minimum current threshold, the charging current may be increased. The method may further comprise again comparing the charging voltage level of the charging device to the charge voltage range and comparing the charging current to a charge current range. Based on a determination that the charging voltage level of the charging device is within the charge voltage range and the charging current is within the charge current range, the method may include increasing the charging current.

The method may further comprise reducing the charging current to a previous charging current level and continuing to charge the electronic device at the previous charging current level based on a determination that the charging voltage level of the charging device is not within the charge voltage range or the charging current is not within the charge current range. The method may further comprise allowing a predetermined time after starting to charge the battery of the chargeable electronic device with the charging current before comparing the charging current to the charge current range of the chargeable electronic device. The predetermined time based on a stabilization time of the charging device or a stabilization time of the chargeable electronic device.

An example electronic device having a USB interface may be configured to attach to and detach from a charging device. The electronic device may comprise a rechargeable battery configured to receive a charging current and charge with the charging current. The electronic device may further comprise a current sensor coupled to the rechargeable battery that is configured to measure the charging current. The electronic device may further comprise a voltage sensor configured to measure a charging voltage level of the charging device when the charging device is attached to the electronic device. The electronic device may further comprise a controller coupled to the voltage sensor and the current sensor.

The controller may be configured to compare the charging voltage level with a charge voltage range of the electronic device. The controller may be further configured to charge the battery with the charging current based on a determination that the charging voltage level is within the charge voltage range. The controller may further be configured to measure the charging current. The controller may further be configured to increase the charging current based on a determination that the charging current is above a minimum charging current threshold. The controller may further be configured to again compare the charging voltage level of the charging device to the voltage range and again compare the charging current to the charge current range. The controller may further be configured to continue to charge the chargeable electronic device with the charging current based on a determination that the charging voltage level of the charging device is within the charge voltage range and the charging current is within the charge current range.

The charging device may not be configured to perform power negotiation between the charging device and the chargeable electronic device. The controller may be further configured to determine whether an auxiliary circuit of the electronic device is enabled or disabled based on a determination that the charging current is at or below the minimum current threshold. The controller may further be configured to disable the auxiliary circuit based on a determination that the auxiliary circuit is enabled. The controller may be further configured to place the electronic device in a low power mode or display an error indicator on the electronic device based on a determination that the auxiliary circuit is disabled.

The controller may further be configured to decrease the charge current and again compare the charging voltage level of the charging device to the charge voltage range and again compare the charging current to the charge current range based on a determination that the charging voltage level of the charging device is not within the charge voltage range or the charging current is not within the charge current range. The controller may further be configured to allow a predetermined time after starting to charge the battery of the electronic device with the charging current before comparing the charging current to the charge current range of the electronic device, wherein the predetermined time is based on a stabilization time of the charging device or stabilization time of the electronic device. The chargeable electronic device may further comprise a DC-DC converter coupled to the controller. The DC-DC converter may be configured to generate the charging current.

BRIEF DESCRIPTION OF THE DRAWINGS

The following detailed description will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

FIG. 6 depicts a method of charging an electronic device, in accordance with some embodiments.

FIG. 7 depicts a method of charging an electronic device, in accordance with some embodiments.

DETAILED DESCRIPTION

Figure 1:
FIG. 1 depicts a chargeable electronic device, in accordance with some embodiments.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Conventional chargeable electronic devices may determine a specified charging power or charging current they can receive from a charging device based on a fixed hardware signal, such as from a resistor on a charging cable. However, conventional charging cables may indicate charging parameters lower than those which the conventional chargeable electronic device is actually capable of receiving to establish compatibility with a wide range of charging devices, including low-power external power supplies and charging devices not employing USB-Power Delivery (USB-PD) technology. As a result, the conventional chargeable electronic devices may be charged at charging parameters below those of which they are capable of receiving. This can result in inefficiency and higher charging times.

Furthermore, the charging power supplied to these conventional chargeable electronic devices may be insufficient to overcome the power drawn from a rechargeable battery of the conventional chargeable electronic device. For example, the charging power may be insufficient to overcome the power from the rechargeable battery supplied to auxiliary circuits within the conventional chargeable electronic device such as LEDs or USB output circuits. Thus, conventional charging systems and methods can result in indications that the conventional chargeable electronic device is being charged, when in fact the rechargeable battery is experiencing a net decrease in charge. Systems and methods disclosed herein may safely and effectively increase the charging current received by a chargeable electronic device from a charging device without conventional power negotiation between the chargeable electronic device and the charging device, thus resulting in lower charge times and increased charging efficiency.

FIG. 1 depicts a chargeable electronic device, in accordance with some embodiments. In the example of FIG. 1, the chargeable electronic device 100 is a jumpstarting device that may be used to jump start, for example, a battery of a motor vehicle. The chargeable electronic device 100 may include a USB charging port 101 (e.g., USB receptacle). The USB charging port 101 may include, for example, a USB-C or a USB input port for charging an internal rechargeable battery. The chargeable electronic device 100 may be connected to a charging device (not shown) at the USB charging port 101, as further described below with reference to FIG. 2. The chargeable electronic device 100 may include auxiliary circuits which can consume power from the internal rechargeable battery during charging and during standard operations (e.g., jump starting a depleted or discharged battery).

The auxiliary circuits may include, for example, a USB output port 106 for providing charge from the rechargeable battery to other portable devices such as smartphones, tablets, and portable speakers. Further auxiliary circuits may include an output indicator 107 showing that power is being provided to the USB output port, a power on indicator 109 showing that the chargeable electronic device is powered on, an LED fuel gauge indicator 102, and a reverse indicator 108 capable of showing that the rechargeable battery is connected to an external battery with reverse polarity. The chargeable electronic device 100 may include a power on switch 105 and a flashlight control switch 104 for turning on one or more flashlight LED lights. A positive battery cable (not shown) and a negative battery cable (not shown) may be attached to the chargeable electronic device 100 at an output port 103. A battery clamp (not shown) may be attached to each of the positive and negative battery clamps. The battery clamps may be attached to, for example, an automobile battery.

Figure 2:
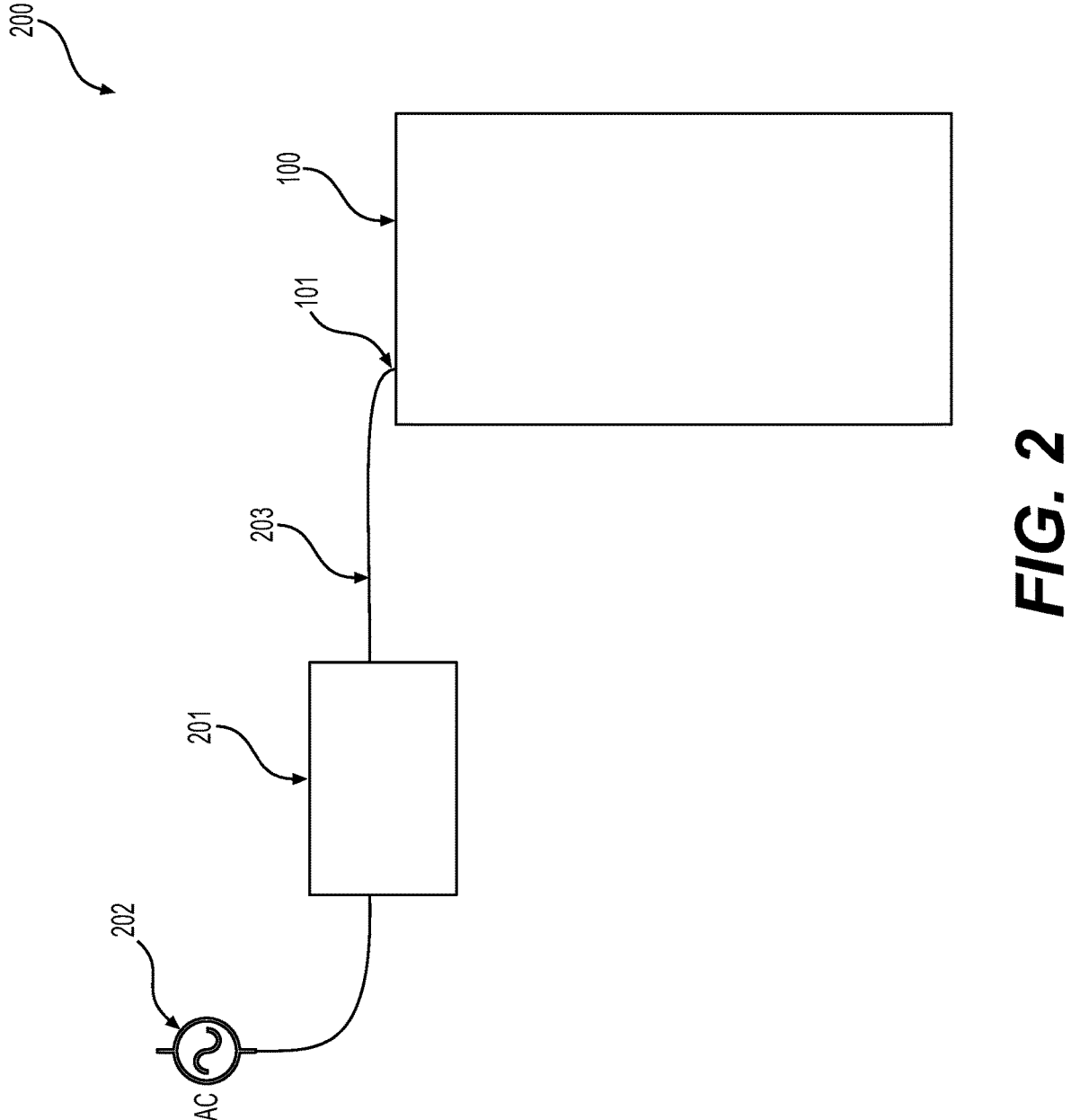
FIG. 2 depicts a charging system, in accordance with some embodiments.

FIG. 2 depicts a charging system, in accordance with some embodiments. The charging system may include a charging device 201. The charging device 201 may be, for example, a USB wall charger. The charging device 201 may receive power from a power source 202. In the example embodiment depicted in FIG. 2, the power source 202 is an alternate current (AC) power source. The charging device 201 may connect to the power source 202, for example, through an electrical outlet (e.g., a wall outlet). In some example embodiments, the charging device 201 may generate power independently (e.g., from an internal battery). The charging device 201 may include a charging cord 203 that can connect and disconnect from the chargeable electronic device 100. The charging cord 203 may include, for example, a USB or USB-C plug for attaching to the USB charging port 101 of the chargeable electronic device 100.

Figure 3:
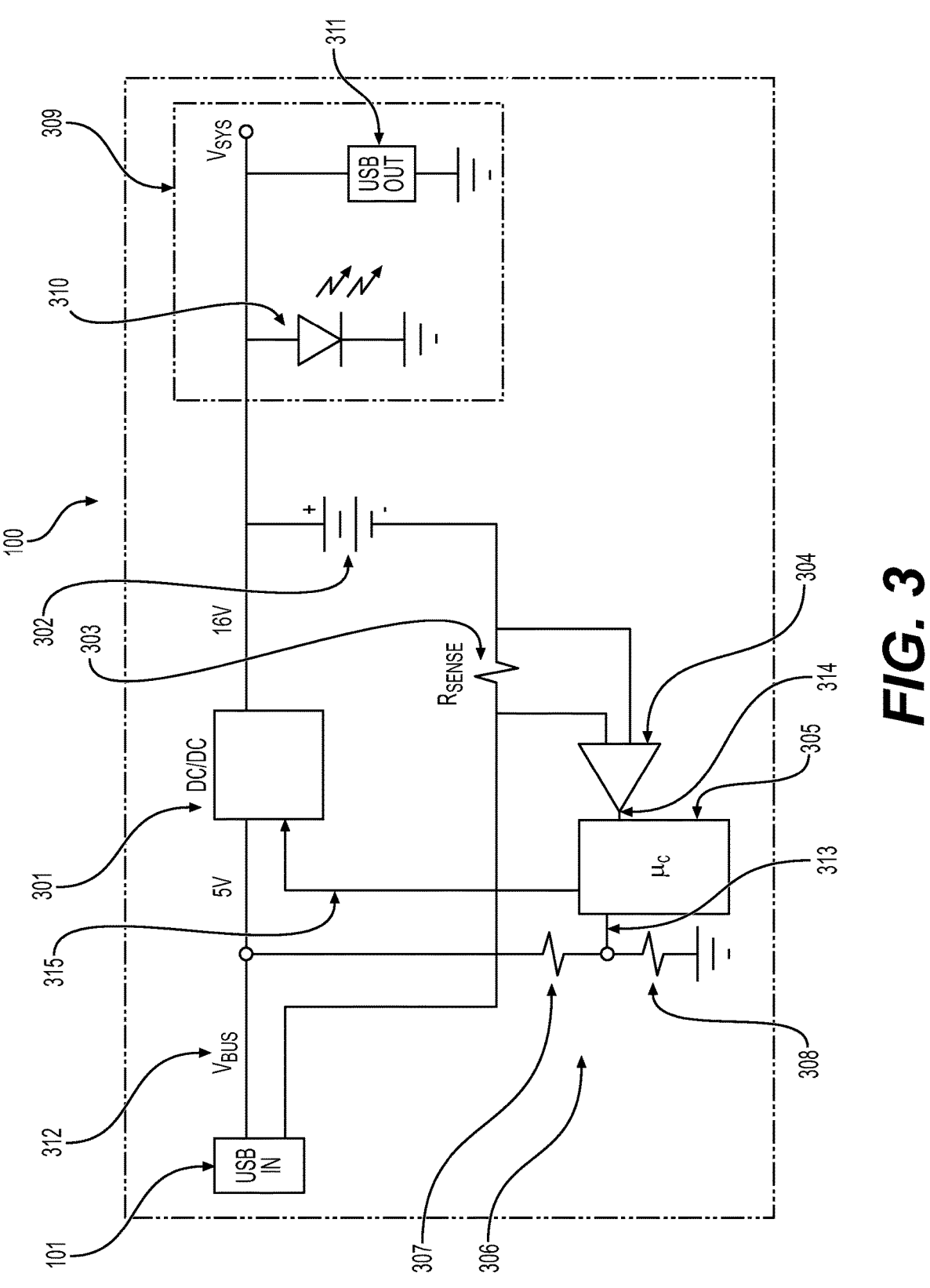
FIG. 3 depicts a circuit diagram of a chargeable electronic device, in accordance with some embodiments.

FIG. 3 depicts a circuit diagram of the chargeable electronic device, in accordance with some embodiments. FIG. 3 may be better understood when referenced in conjunction with FIG. 2 with respect to the following description. The chargeable electronic device 100 may comprise the USB charging port 101, a DC-DC converter 301, a rechargeable battery 302, and a current sensor 303. The DC-DC converter 301 may be, for example, a Renesas ISL9238 CIRTZ-T unit. The USB charging port 101, the DC-DC converter 301, the rechargeable battery 302, and the current sensor 303 may be connected to one another in series. The chargeable electronic device 100 may further include one or more auxiliary circuits 309 coupled to the battery 302. The chargeable electronic device 100 may further include an amplifier 304 coupled to the current sensor 303 and a voltage sensor 306 coupled to the USB charging port 101. The chargeable electronic device 100 may also include a controller 305 coupled to the amplifier 304 and the voltage sensor 306. The controller 305 may generate a control signal 315 based on the amplifier 304 and the voltage sensor 306.

The chargeable electronic device 100 may receive a charging plug (e.g., a USB or a USB-C plug) from the charging device 201 at the USB charging port 101. The chargeable electronic device 100 may detect a charging voltage of the charging device 201 at a bus voltage node $V_{BUS}$ 312. The electronic device may detect the charging voltage, for example, through a connection between corresponding pins of the USB charging port 101 and the charging plug of the charging device 201. Charging devices employing later USB protocols may provide data connection points at additional corresponding pins of the USB charging port 101 and the charging plug of the connection device that can be used for power negotiations between the charging device and the chargeable electronic device. However, some chargeable electronic devices utilize other USB protocols in which the chargeable electronic device cannot perform power negotiations with a charging device. The chargeable electronic device 100 may utilize the available connections and the charging voltage to improve charging parameters of an attached charging device, despite being unable to negotiate or communicate with the charging device through USB data pins.

The voltage sensor 306 may be coupled to the bus voltage node $V_{BUS}$ 312 and may be used to detect the charging voltage of the charging device 201. The voltage sensor 306 may be, for example, a voltage divider. The voltage divider may include a first resistor 307 and a second resistor 308. As described above, the voltage sensor 306 may be coupled to the controller 305. The controller 305 may be, for example, a microcontroller. When the charging device 201 is connected to the chargeable electronic device 201 by the charging plug, the voltage sensor can detect the charging voltage level at the bus voltage node $V_{BUS}$ 312 and generate an input voltage signal 313 based on the charging voltage level. The controller 305 can then receive this input voltage signal 313.

The controller 305 may determine, based on the input voltage signal 313, whether the charging voltage level is within a charging voltage range of the chargeable electronic device 100. The charge voltage range may be an acceptable range of voltage with which the chargeable electronic device 100 can safely and effectively charge the rechargeable battery 302. For example, a typical charging voltage level may be approximately 5.0 V for a USB or USB-C charging plug. The charge voltage range may be a range within a predetermined voltage of this typical charging voltage level (e.g., 5.0 V±1 V, or 4.0-6.0 V).

If the charging voltage level is not within the charge voltage range, the controller 305 may generate a control signal 315 indicating that the charging voltage level is not within the charge voltage range. Based on this control signal 315, the chargeable electronic device 100 may enter a low power mode and may display an error indicator (e.g., an error message or error light). If the charging voltage level is within the charge voltage range, the controller 305 may generate a control signal 315 indicating that the charging voltage level is within the charge voltage range. Based on this control signal 315, the chargeable electronic device 100 may enable the DC-DC converter 301 and the DC-DC converter 301 may generate a charging current to charge the rechargeable battery 302.

In the example in which the charging voltage level is within the charge voltage range, the chargeable electronic device 100 may allow a predetermined time (e.g., one second) for the charge current to stabilize. This may be necessary, for example, to avoid measuring transient currents within the chargeable electronic device 100. After the predetermined time has passed since the charge current was produced, the current sensor 303 may measure the charge current. The charge current may be measured, for example, by measuring the voltage resulting from the charge current passing through the current sensor 303. In the example embodiment depicted in FIG. 3, the current sensor 303 includes a sensing resistor $R_{SENSE}$. The amplifier 304 may be coupled to a first side of the current sensor 303 and a second side of the current sensor 303. The amplifier may determine the charge current, for example, by measuring a voltage drop across the current sensor 303 (e.g., the sensing resistor $R_{SENSE}$). Based on the charge current, the amplifier 304 may generate a current level signal 314. The current level signal 314 may represent the charge current but may be in the form of a current signal or a voltage signal.

Based on the current level signal 314, the controller 305 may compare the charge current to a minimum threshold current level. The minimum threshold current level may be, for example, a minimum current level necessary to safely and effectively charge the rechargeable battery 302. If the charging current is greater than the minimum threshold current level, the controller 305 may generate a control signal 315 indicating that the charging current is greater than the minimum threshold current level. The DC-DC converter 301 may receive this control signal 315 and increase the charging current. For example, the DC-DC converter 301 may increase the charging current by a predetermined amount.

If the charging current is not greater than the minimum threshold current level, the controller 305 may generate a control signal 315 indicating that the charging current is not greater than the minimum threshold current level. Based on this control signal 315, the chargeable electronic device 100 may determine whether auxiliary circuits 309 are active (e.g., enabled). Auxiliary circuits may include, for example, a flashlight circuit 310 or a USB output circuit 311. If no auxiliary circuits are active, the chargeable electronic device 100 may enter the low power mode and display an error indicator. If one or more auxiliary circuits 309 are active, the chargeable electronic device 100 may turn off (e.g., disable) the auxiliary circuits 309.

If the charging current has been increased based on the determination that the charging current is greater than the minimum threshold current level, the controller 305 may allow for a predetermined time (e.g., one second) for the charging system, including the charging voltage and the charging current, to stabilize. As discussed above, it may be necessary or desirable to allow a predetermined time for the charging voltage and charging current to stabilize to avoid measuring transient currents or voltages that are not representative characteristics of the chargeable electronic device 100. After the predetermined time has passed, the controller 305 may measure the charging current based on the current level signal 314 and may measure the charging voltage based on the input voltage signal 313.

The controller 305 may then determine, based on the current level signal 314 and the input voltage signal 313, whether the charging current is within a charge current range and whether the charging voltage level is within the charge voltage range. The charge current range may be, for example, a range between the minimum threshold current level and an upper current limit representing the maximum current by which the rechargeable battery can safely and effectively charge. The upper current level may additionally or alternatively represent a maximum output current level of the DC-DC converter 301. If the charging voltage level is within the charge voltage range and the charging current is within the charge current range, the chargeable electronic device 100 may apply a flag (e.g., an indicator) indicating that the charging current has been modified. The flag may be applied, for example, by a variable within software of the controller 305. After the flag is applied, the chargeable electronic device 100 may continue charging the rechargeable battery 302 at the existing charging current until a charging cycle is complete (e.g., the rechargeable battery 302 is fully charged or the charging device 201 is disconnected from the chargeable electronic device 100).

If the charging voltage level is not within the charge voltage range or the charging current is not within the charge current range, the controller 305 may generate a control signal 315 indicating that either or both of the charging voltage level and the charging current are not within their respective ranges. Based on this control signal 315, the DC-DC converter may decrease the charging current by a predetermined amount (e.g., 0.1 amperes). The controller 305 may then allow for the predetermined time for the charging current and the charging voltage level to stabilize.

After the predetermined time has passed from decreasing the charging current and the charging current has stabilized, the controller 305 may again determine, based on the current level signal 314 and the input voltage signal 313, whether the charging current is within a charge current range and whether the charging voltage level is within the charge voltage range.

If either the charge current of the charging voltage level are not within their respective ranges, the controller 305 may generate a control signal indicating that either or both of the charging voltage level and the charging current are not within their respective ranges and the DC-DC converter may accordingly decrease the charging current by the predetermined amount. This process may repeat sequentially until both the charging current is within the charge current range and the charging voltage level is within the charge voltage range. When both the charging current and charging voltage level are within their acceptable permissible ranges, the flag may be added and the chargeable electronic device 100 may continue charging the rechargeable battery 302 until the charging cycle is complete.

In some example embodiments, a flag may not be applied after a determination that the charging voltage level is within the charge voltage range and the charging current is within the charge current range. Rather, the controller 305 may generate a control signal 315 indicating that the charging voltage level and the charging current are each within their respective ranges. Based on this control signal 315, the DC-DC converter 301 may increase the charging current by a predetermined increment (e.g., 0.1 Amperes). The controller 305 may then allow a predetermined time for the charging current and the charging voltage level to stabilize. After the predetermined time has passed from increasing the charging current, the controller 305 may again determine whether the charge voltage level is within the charge voltage range and the charging current is within the charge current range.

This process may repeat until the controller 305 determines that either or both of the charge voltage level and the charging current are not within their respective permissible ranges. After the controller determines that either or both of the charge voltage level and the charging current are not within their respective permissible ranges, the controller 305 may generate a control signal 315 indicating that either or both of the charge voltage level and the charging current are not within their respective permissible ranges, and the DC-DC converter 301 may then reduce the charging current by a predetermined amount. For example, the charging current may be reduced by a single increment (e.g., the charging current generated in an immediately preceding cycle). By reducing the charging current by a single increment, a charging current value may be generated that has already been determined by the controller 305 to be within the charge voltage range and to result in a charge voltage level within the charge voltage range. The controller 305 may then add the flag indicating that the charging current has been sufficiently modified, and the chargeable electronic device 100 may continue charging the rechargeable battery 302 until the charge cycle is complete.

Figure 4:
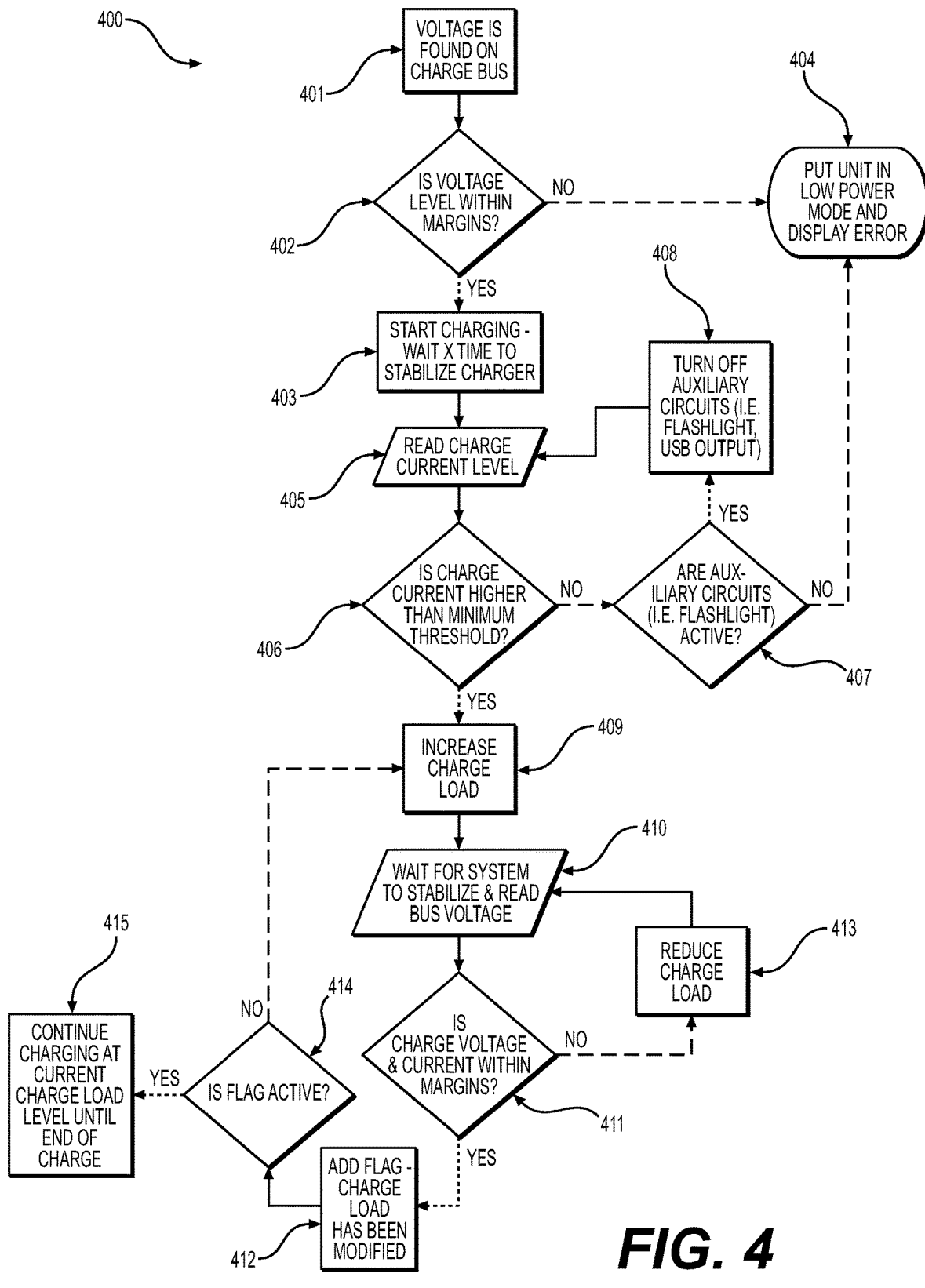
FIG. 4 depicts a flow diagram of a method of charging an electronic device, in accordance with some embodiments.

FIG. 4 depicts a flow diagram of a method of charging a chargeable electronic device, in accordance with some embodiments. The method 400 may be employed, for example, by the example embodiment of the chargeable electronic device 100 depicted in FIG. 1, 2, or 3. A first step may be to detect a voltage on a charge bus, as shown by block 401. The voltage on the charge bus may be determined at a bus node of the chargeable electronic device when a charging device is connected to the chargeable electronic device. After the voltage is detected on the charge bus, a next step may be to determine whether the voltage on the charge bus is within a charge voltage range, as shown by block 402. The charge voltage range may be an acceptable range of voltage with which the chargeable electronic device can safely and effectively charge a rechargeable battery. If the voltage on the charge bus is within the charge voltage range, a next step may be to begin charging the rechargeable battery with a charging current, as shown by block 403. The chargeable electronic device may allow a predetermined time for the charging current and the voltage on the charge bus to stabilize.

If the voltage on the charge bus is not within the charge voltage range, the chargeable electronic device may enter a low power mode and display an error indicator (e.g., an error message or an error light), as shown by block 404. If the voltage on the charge bus is within the charge voltage range and the charging current has stabilized, the charging current level can be measured, as shown in block 405. As shown in block 406, a next step may be to determine whether the charging current is higher than a minimum threshold current level. If the charging current is higher than the minimum threshold current level, a next step may be to increase the charging current, as depicted in 409. The charging current may be increased, for example, by a predetermined value.

If the charging current is not higher than the minimum threshold current level, a next step may be to determine whether any auxiliary circuits are active (e.g., enabled), as shown in block 407. Auxiliary circuits may include components such as a flashlight or USB output circuit. Auxiliary circuits can obtain current from the rechargeable battery and may thus decrease an ability of the chargeable electronic device to charge the rechargeable battery. If one or more auxiliary circuits are on, a next step may be to turn off (e.g., disable) these auxiliary circuits, as shown in block 408. In some example embodiments, a single auxiliary circuit may be turned off at block 408 and different auxiliary circuits may be turned off if the method subsequently returns to block 408. After the auxiliary circuits are turned off at block 408, the charge current may be measured again at step 405. If no auxiliary circuits are active, the chargeable electronic device may enter a low power mode and display the error indicator, as shown in block 404.

After the charging current is increased at block 409, a next step may be to allow a predetermined time for the chargeable electronic device to stabilize, as shown at block 410. For example, the charging current and the voltage on the charge bus may stabilize (e.g., reach a substantially constant level). After this predetermined time for the chargeable electronic device to stabilize, the voltage on the charge bus may be measured, as also shown at block 410. A next step, as shown by block 411, may be to determine whether the charging voltage level is within a charge voltage range and whether the charging current is within a charge current range. The charge current range may be, for example, a range between the minimum threshold current level and an upper current limit representing the maximum current by which the rechargeable battery can safely and effectively charge.

If the charging voltage level is within the charge voltage range and the charging current is within the charge current range, a next step may be to add a charging flag, as shown by block 414. The charging flag may be added, for example, by software within the chargeable electronic device. After the charging flag is added, a next step may be to determine whether the charging flag is active, as shown by block 414. If the charging flag is not active, the method may return to the step of increasing the charging current, as shown in block 409. If the charging flag is active, the chargeable electronic device may continue charging the rechargeable battery with the existing charging current until a charge cycle is completed (e.g., until the rechargeable battery is fully charged or until the charging device is disconnected from the chargeable electronic device), as shown by block 415.

If the charging voltage level is not within the charge voltage range or the charging current is not within the charge current range at the step shown by block 411, a next step may be to reduce the charging current, as shown by block 413. After the charging current is reduced, a next step may be to allow a predetermined time for the chargeable electronic device to stabilize, as shown by the return to block 410. After this predetermined time for the chargeable electronic device to stabilize, the voltage on the charge bus may be measured, as also shown at block 410. This process may repeat until both the charging voltage level is within the charge voltage range and the charging current is within the charge current range, as shown by the path between blocks 410, 411, and 413.

Figure 5:
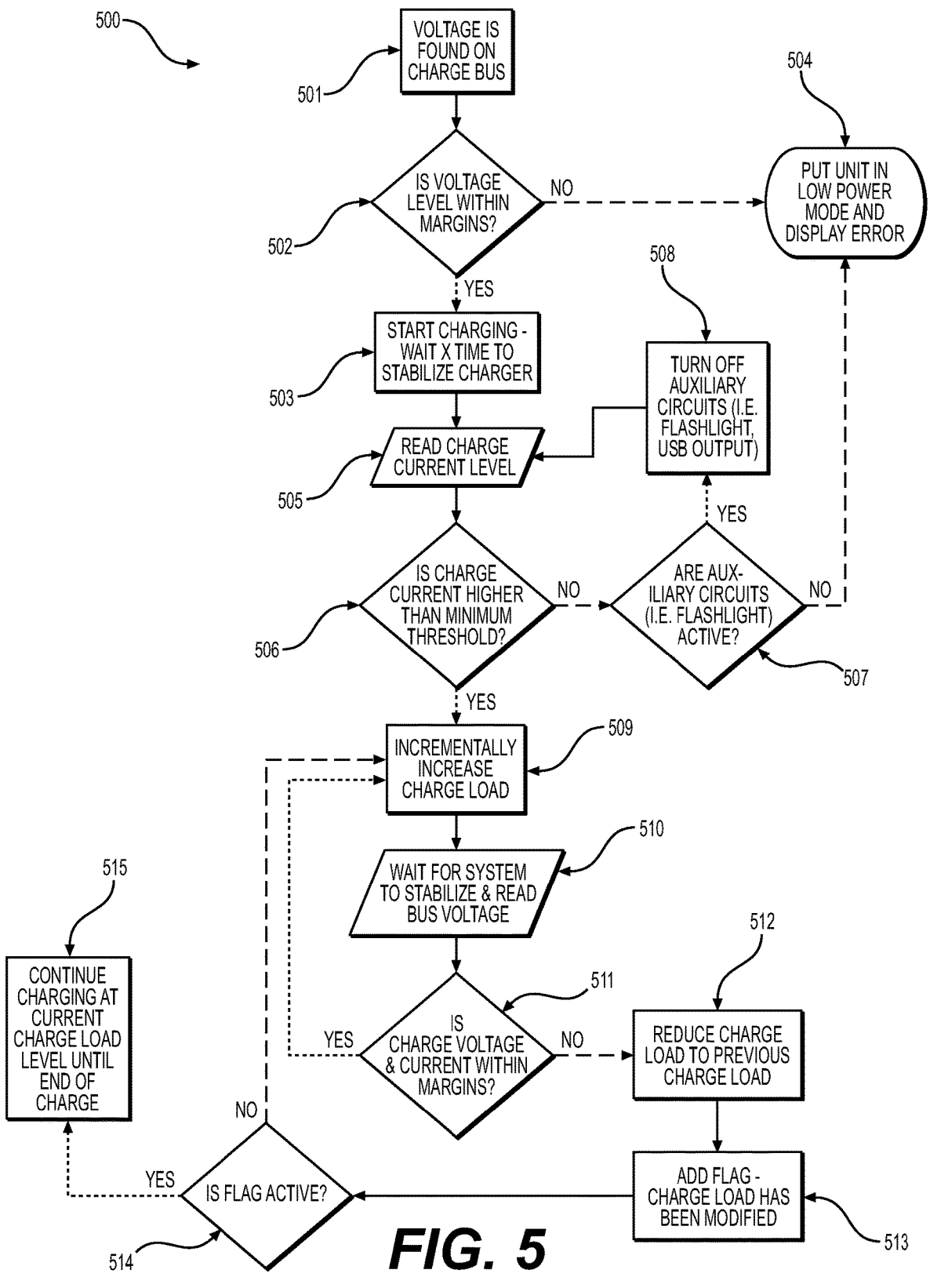
FIG. 5 depicts a flow chart of a method of charging an electronic device, in accordance with some embodiments.

FIG. 5 depicts a flow chart of a method of charging a chargeable electronic device, in accordance with some embodiments. The method 500 may be employed, for example, by the example embodiment of the chargeable electronic device 100 depicted in FIG. 1, 2, or 3. A first step may be to detect a voltage on a charge bus, as shown by block 501. The voltage on the charge bus may be determined at a bus node of the chargeable electronic device when a charging device is connected to the chargeable electronic device. After the voltage is detected on the charge bus, a next step may be to determine whether the voltage on the charge bus is within a charge voltage range, as shown by block 502. The charge voltage range may be an acceptable range of voltage with which the chargeable electronic device can safely and effectively charge a rechargeable battery. If the voltage on the charge bus is within the charge voltage range, a next step may be to begin charging the rechargeable battery with a charging current, as shown by block 503. The chargeable electronic device may allow a predetermined time for the charging current and the voltage on the charge bus to stabilize.

If the voltage on the charge bus is not within the charge voltage range, the chargeable electronic device may enter a low power mode and display an error indicator (e.g., an error message or an error light), as shown by block 504. If the voltage on the charge bus is within the charge voltage range and the charging current has stabilized, the charging current level can be measured, as shown in block 505. As shown in block 506, a next step may be to determine whether the charging current is higher than a minimum threshold current level. If the charging current is higher than the minimum threshold current level, a next step may be to incrementally increase the charging current, as depicted in 509. The charging current may be increased, for example, by a predetermined value. The predetermined value used to incrementally increase the charging current as shown by block 509 may be a smaller value than the predetermined value used to increase the charging current shown by block 409 of FIG. 4.

If the charging current is not higher than the minimum threshold current level, a next step may be to determine whether any auxiliary circuits are active (e.g., enabled), as shown in block 507. Auxiliary circuits may include components such as a flashlight or USB output circuit. Auxiliary circuits can obtain current from the rechargeable battery and may thus decrease an ability of the chargeable electronic device to charge the rechargeable battery. If one or more auxiliary circuits are on, a next step may be to turn off (e.g., disable) these auxiliary circuits, as shown in block 508. In some example embodiments, a single auxiliary circuit may be turned off at block 508 and different auxiliary circuits may be turned off if the method subsequently returns to block 508. After the auxiliary circuits are turned off at block 508, the charge current may be measured again at step 505. If no auxiliary circuits are active, the chargeable electronic device may enter a low power mode and display the error indicator, as shown in block 504.

After the charging current is increased at block 509, a next step may be to allow a predetermined time for the chargeable electronic device to stabilize, as shown at block 510. For example, the charging current and the voltage on the charge bus may stabilize (e.g., reach a substantially constant level). After this predetermined time for the chargeable electronic device to stabilize, the voltage on the charge bus may be measured, as also shown at block 510. A next step may be to determine whether the voltage on the charge voltage bus is within a charge voltage range and whether the charging current is within a charge current range, as shown by block 511. The charge current range may be, for example, a range between the minimum threshold current level and an upper current limit representing the maximum current by which the rechargeable battery can safely and effectively charge.

If both the voltage on the charge voltage bus is within the charge voltage range and the charging current is within the charge current range, the method 500 may return to the step shown by block 509 to incrementally increase the charge current. If either or both of the voltage on the charge bus is not within the charge voltage range and the charging current is not within the charge current range, the next step may be to reduce the charging current to the previous charging current value. The charging current may be reduced to the previous charging current value because the method 500 may have previously verified at the step shown by block 506 that the charging current at this previous time was greater than the minimum charging current threshold, and thus sufficient to charge the rechargeable battery.

The next step after reducing the charging current at block 512 may be to add a charging flag, as shown by block 513. The charging flag may be added, for example, by software within the chargeable electronic device. After the charging flag is added, a next step may be to determine whether the charging flag is active, as shown by block 514. If the charging flag is active, the chargeable electronic device may continue charging the rechargeable battery with the existing charging current until a charge cycle is completed (e.g., until the rechargeable battery is fully charged or until the charging device is disconnected from the chargeable electronic device), as shown by block 515. If the charging flag is not active, the next step may be to again incrementally increase the charging current, as shown by block 509.

FIG. 6 depicts a method of charging a chargeable electronic device, in accordance with some embodiments. In the example embodiment depicted in FIG. 6, a first step 601 of the method is to compare a charging voltage level of a charging device to a charge voltage range of a chargeable electronic device. A second step 602 may be to charge a battery of the chargeable electronic device with a charging current based on a determination that the charging voltage level of the charging device is within the charging voltage range of the chargeable electronic device. A third step 603 may be to compare the charging current to a minimum current threshold of the chargeable electronic device. A fourth step 604 may be to increase the charging current based on a determination that the charging current is above the minimum current threshold. A fifth step 605 may be to again compare the charging voltage level of the charging device to the charge voltage range and compare the charging current to a charge current range. A sixth step 606 may be to continue to charge the chargeable electronic device with the charging current based on a determination that the charging voltage level of the charging device is within the charge voltage range and the charging current is within the charge current range. In some example embodiments, steps depicted in FIG. 6 may be omitted. Furthermore, the steps shown in FIG. 6 may be performed in an order that differs from the order depicted in FIG. 6.

FIG. 7 depicts a method of charging a chargeable electronic device, in accordance with some embodiments. In the example embodiment depicted in FIG. 7, a first step 701 of the method is to compare a charging voltage level of a charging device to a charge voltage range of a chargeable electronic device. A second step 702 may be to charge a battery of the chargeable electronic device with a charging current based on a determination that the charging voltage level of the charging device is within the charging voltage range of the chargeable electronic device. A third step 703 may be to compare the charging current to a minimum current threshold of the chargeable electronic device. A fourth step 704 may be to increase the charging current based on a determination that the charging current is above the minimum current threshold. A fifth step 705 may be to again compare the charging voltage level of the charging device to the charge voltage range and compare the charging current to a charge current range. A sixth step 706 may be to again increase the charging current based on a determination that the charging voltage level of the charging device is within the charge voltage range and the charging current is within the charge current range. In some example embodiments, steps depicted in FIG. 7 may be omitted. Furthermore, the steps shown in FIG. 7 may be performed in an order that differs from the order depicted in FIG. 7.

Figure 8:
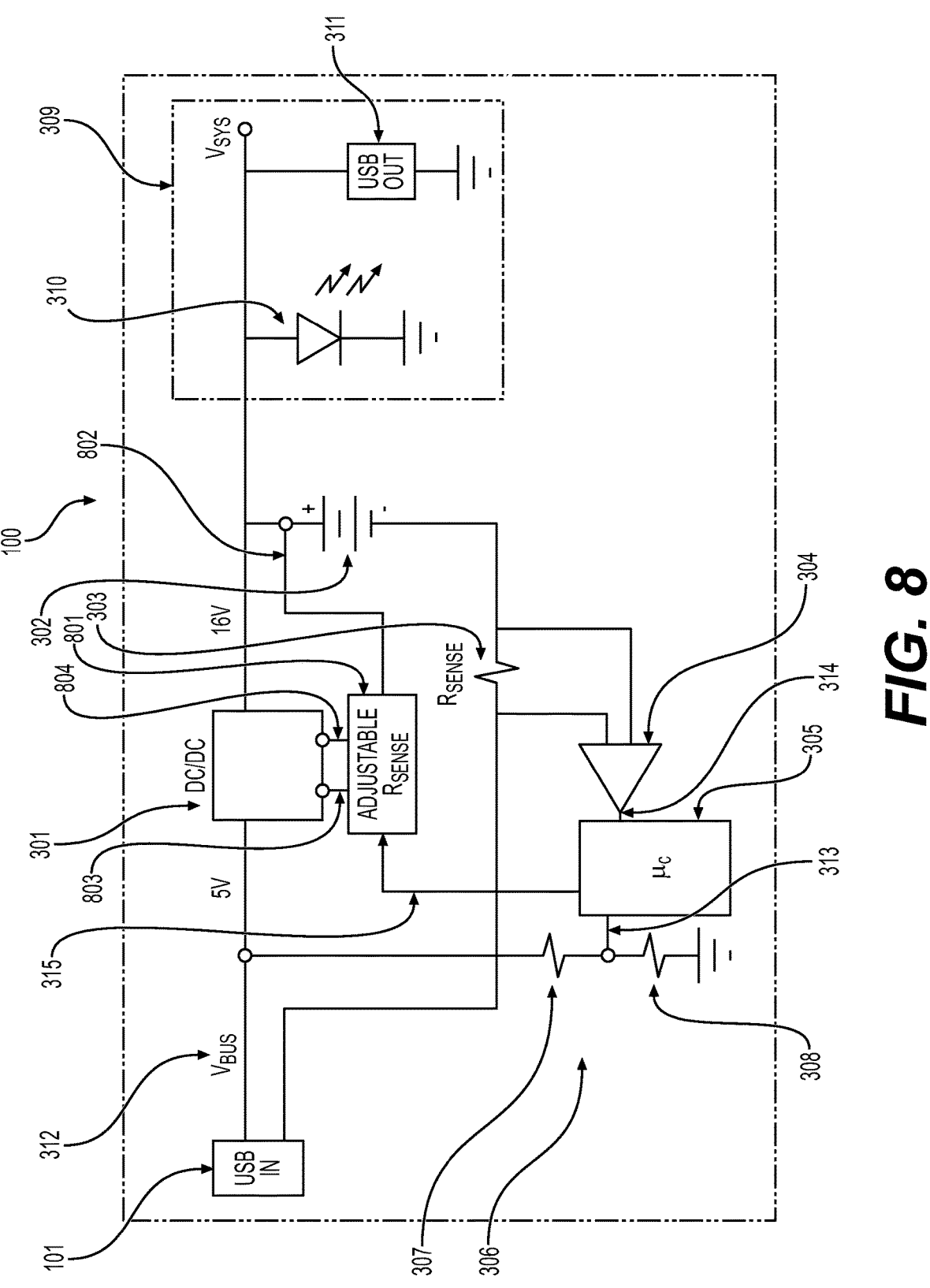
FIG. 8 depicts another example circuit diagram of a chargeable electronic device, in accordance with some embodiments.

FIG. 8 depicts a circuit diagram of a chargeable electronic device, in accordance with some embodiments. One or more components of the chargeable electronic device depicted in FIG. 8 may be substantially similar to the components of the example chargeable electronic device depicted in FIG. 3. In the example depicted in FIG. 8, the chargeable electronic device 100 includes an adjustable $R_{SENSE}$ circuit 801. The DC-DC converter 301 may be, for example, a Renesas ISL9238 CIRTZ-T unit. The adjustable $R_{SENSE}$ circuit 801 may be coupled to a first pin 803 (e.g., a CSON pin) and a second pin 804 (e.g., a CSOP pin) of the DC-DC converter 301. Depending on the specific DC-DC converter 301 implemented in the chargeable electronic device 100, the number or type of pins to which the adjustable $R_{SENSE}$ circuit 801 is connected may differ. The adjustable $R_{SENSE}$ circuit 801 may also be coupled to a battery input node 802.

The adjustable $R_{SENSE}$ circuit 801 may be used to control the current output of the DC-DC converter 301. For example, the adjustable $R_{SENSE}$ circuit 801 may be coupled to the controller 305 and may receive the control signal 315. Based on the control signal 315, the adjustable $R_{SENSE}$ circuit 801 may adjust its internal resistance. The adjustable $R_{SENSE}$ circuit 801 may adjust the resistance, for example, by switching a resistor in parallel with a current sense resistor. The internal resistance of the adjustable $R_{SENSE}$ circuit 801 may be detected by the first and second pins (803, 804). Based on an increase in internal resistance of the $R_{SENSE}$ circuit 801, the DC-DC converter 301 may sense a reduced charging current and may accordingly increase its current output (e.g., the charging current). Based on a decrease in internal resistance of the $R_{SENSE}$ circuit 801, the DC-DC converter 301 may sense an increased charging current and may accordingly reduce its current output.

Figure 9:
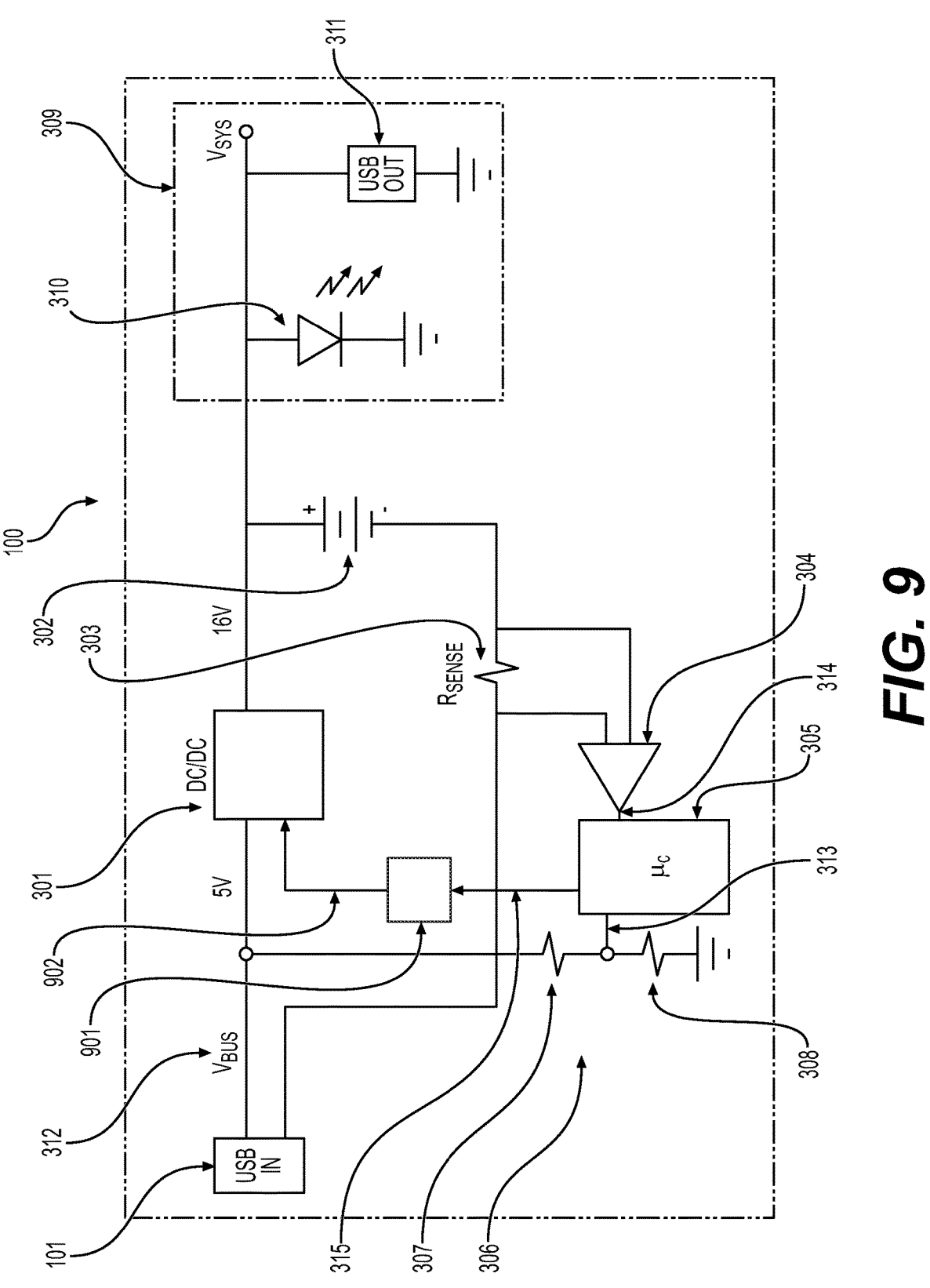
FIG. 9 depicts yet another example circuit diagram of a chargeable electronic device, in accordance with some embodiments

FIG. 9 depicts a circuit diagram of a chargeable electronic device, in accordance with some embodiments. One or more components of the example chargeable electronic device 100 depicted in FIG. 9 may be substantially similar to the components of the example chargeable electronic device 100 depicted in FIG. 3. In the example depicted in FIG. 9, the chargeable electronic device 100 includes an adjustable current limit resistor circuit 901. The adjustable current limit resistor circuit 901 may be coupled to the DC-DC converter 301. The DC-DC converter 301 may be, for example, a Feeling Technology FP6293 unit. The Feeling Technology FP6293 unit includes a current limit input channel that controls its current output (e.g., the charging current). The adjustable current limit resistor circuit may thus be used to control the current output of the DC-DC converter 301 by controlling the input received at the current limit input channel. For example, the adjustable current limit resistor circuit 901 may receive the control signal 315 from the controller 305. Based on the control signal 315, the adjustable current limit resistor circuit 901 may select from two or more current limit inputs 902 to be received at the current limit input channel of the DC-DC converter 301. The DC-DC converter 301 may increase or decrease the generated current output based on the received current limit input 902.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. A method of charging a chargeable electronic device with a USB interface comprising:
   comparing a charging voltage level of a charging device to a charge voltage range of a chargeable electronic device;
   based on a determination that the charging voltage level of the charging device is within the charge voltage range of the chargeable electronic device, charging a battery of the chargeable electronic device with a charging current;
   comparing the charging current to a minimum current threshold of the chargeable electronic device;
   based on a determination that the charging current is above the minimum current threshold, increasing the charging current;
   again comparing the charging voltage level of the charging device to the charge voltage range and comparing the charging current to a charge current range; and
   based on a determination that the charging voltage level of the charging device is within the charge voltage range and the charging current is within the charge current range, continuing to charge the chargeable electronic device with the charging current.

2. The method of claim 1, wherein the method is performed without power negotiation between the charging device and the chargeable electronic device.

3. The method of claim 1, further comprising based on a determination that the charging current is at or below the minimum current threshold, determining whether an auxiliary circuit of the chargeable electronic device is enabled or disabled.

4. The method of claim 3, further comprising based on a determination that the auxiliary circuit is enabled, disabling the auxiliary circuit.

5. The method of claim 3, further comprising based on a determination that the auxiliary circuit is disabled, placing the chargeable electronic device in a low power mode or displaying an error indicator on the chargeable electronic device.

6. The method of claim 1, further comprising based on a determination that the charging voltage level of the charging device is not within the charge voltage range or the charging current is not within the charge current range, decreasing the charge current and again comparing the charging voltage level of the charging device to the charge voltage range and again comparing the charging current to the charge current range.

7. A method of charging a chargeable electronic device with a USB interface comprising:

comparing a charging voltage level of a charging device to a charge voltage range of a chargeable electronic device;

based on a determination that the charging voltage level of the charging device is within the charge voltage range of the chargeable electronic device, charging a battery of the chargeable electronic device with a charging current;

comparing the charging current to a minimum current threshold of the chargeable electronic device;

based on a determination that the charging current is above the minimum current threshold, increasing the charging current;

again comparing the charging voltage level of the charging device to the charge voltage range and comparing the charging current to a charge current range; and based on a determination that the charging voltage level of the charging device is within the charge voltage range and the charging current is within the charge current range, again increasing the charging current.

8. The method of claim 7, further comprising based on a determination that the charging voltage level of the charging device is not within the charge voltage range or the charging current is not within the charge current range, reducing the charging current to a previous charging current level and continuing to charge the chargeable electronic device at the previous charging current level.

9. The method of claim 7, further comprising allowing a predetermined time after starting to charge the battery of the chargeable electronic device with the charging current before comparing the charging current to the charge current range of the chargeable electronic device, the predetermined time based on a stabilization time of the charging device or a stabilization time of the chargeable electronic device.

10. A chargeable electronic device having a USB interface, the chargeable electronic device configured to attach to and detach from a charging device, the chargeable electronic device comprising:

a rechargeable battery configured to receive a charging current and charge with the charging current;

a current sensor coupled to the rechargeable battery, the current sensor configured to measure the charging current;

a voltage sensor configured to measure a charging voltage level of the charging device when the charging device is attached to the chargeable electronic device;

a controller coupled to the voltage sensor and the current sensor, the controller configured to:

compare the charging voltage level with a charge voltage range of the chargeable electronic device;

based on a determination that the charging voltage level is within the charge voltage range, charge the battery with the charging current;

measure the charging current;

based on a determination that the charging current is above a minimum current threshold, increase the charging current;

again compare the charging voltage level of the charging device to the charge voltage range and again compare the charging current to the charge current range; and based on a determination that the charging voltage level of the charging device is within the charge voltage range and the charging current is within the charge current range, continue to charge the chargeable electronic device with the charging current.

11. The chargeable electronic device of claim 10, wherein the charging device is not configured to perform power negotiation between the charging device and the chargeable electronic device.

12. The chargeable electronic device of claim 10, the controller further configured to determine whether an auxiliary circuit of the chargeable electronic device is enabled or disabled based on a determination that the charging current is at or below the minimum current threshold.

13. The chargeable electronic device of claim 12, the controller further configured to disable the auxiliary circuit based on a determination that the auxiliary circuit is enabled.

14. The chargeable electronic device of claim 12, the controller further configured to place the chargeable electronic device in a low power mode or display an error indicator on the chargeable electronic device based on a determination that the auxiliary circuit is disabled.

15. The chargeable electronic device of claim 10, the controller further configured to decrease the charge current and again compare the charging voltage level of the charging device to the charge voltage range and again compare the charging current to the charge current range based on a determination that the charging voltage level of the charging device is not within the charge voltage range or the charging current is not within the charge current range.

16. The chargeable electronic device of claim 10, the controller further configured to allow a predetermined time after starting to charge the battery of the chargeable electronic device with the charging current before comparing the charging current to the charge current range of the chargeable electronic device, the predetermined time based on a stabilization time of the charging device or a stabilization time of the chargeable electronic device.

17. The chargeable electronic device of claim 10, further comprising a DC-DC converter coupled to the controller, the DC-DC converter configured to generate the charging current.

\* \* \* \* \*